(12) United States Patent
Sakurada et al.

(10) Patent No.: US 10,160,610 B2
(45) Date of Patent: Dec. 25, 2018

(54) SHAPED STEEL STACKING DEVICE

(71) Applicant: NISSHIN STEEL CO., LTD., Chiyoda-ku, Tokyo (JP)

(72) Inventors: Yasuhiro Sakurada, Sakai (JP); Hiroshi Asada, Sakai (JP); Tooru Ienari, Sakai (JP); Katsuyasu Matsuzawa, Osaka (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/543,380

(22) PCT Filed: Jan. 13, 2016

(86) PCT No.: PCT/JP2016/050783
§ 371 (c)(1),
(2) Date: Jul. 13, 2017

(87) PCT Pub. No.: WO2016/114284
PCT Pub. Date: Jul. 21, 2016

(65) Prior Publication Data
US 2018/0002117 A1    Jan. 4, 2018

(30) Foreign Application Priority Data

Jan. 13, 2016  (JP) ................................. 2015-004269

(51) Int. Cl.
*B65G 57/18*    (2006.01)
*B65G 57/09*    (2006.01)

(52) U.S. Cl.
CPC ............. *B65G 57/18* (2013.01); *B65G 57/09* (2013.01)

(58) Field of Classification Search
CPC ................................ B65G 57/18; B65G 57/09
(Continued)

(56) References Cited

U.S. PATENT DOCUMENTS 3,168,183 A * 2/1965 Copper
3,381,828 A   5/1968 Sheehan
(Continued)

FOREIGN PATENT DOCUMENTS

JP   S4626739 Y1   9/1971
JP   S49135362 A   12/1974
(Continued)

OTHER PUBLICATIONS

Notice of Reasons for Rejection issued to JP Application No. 2015-004269; dated Jan. 10, 2017.
(Continued)

*Primary Examiner* — Saul Rodriguez
*Assistant Examiner* — Lynn E Schwenning
(74) *Attorney, Agent, or Firm* — Cantor Colburn LLP

(57) ABSTRACT

Provided is a stacking device that stacks shaped steel with small-scale equipment using a transporting means with a simple structure. This shaped steel stacking device comprises: a stacking platform on which stacked shaped steel is loaded; a transporting platform that has a plurality of loading faces on which the shaped steel to be transported to the stacking platform is loaded; and a pushing means that pushes the shaped steel loaded on the transporting platform out toward the stacking platform. The transporting platform comprises a first loading face having a flat portion and a second loading face having a flat portion and an inclined portion. The inclined portion is formed on a side facing the stacking platform, and the first and second loading faces can be selected according to the order the shaped steel is pushed out.

4 Claims, 5 Drawing Sheets

(58) Field of Classification Search
USPC .............. 414/784; 198/370.07, 370.02, 890, 198/457.02, 456, 600
See application file for complete search history.

(56) References Cited

U.S. PATENT DOCUMENTS

| | | | |
|---|---|---|---|
| 8,721,254 | B1 * | 5/2014 | Kuhns et al. |
| 2015/0344235 | A1 * | 12/2015 | Barone et al. |

FOREIGN PATENT DOCUMENTS

| | | |
|---|---|---|
| JP | S5396785 U | 8/1978 |
| JP | S5348459 Y2 | 11/1978 |
| JP | S55109622 U | 8/1980 |
| JP | 60236928 A | 11/1985 |
| JP | H0679937 B2 | 10/1994 |
| JP | 2002145449 A | 5/2002 |

OTHER PUBLICATIONS

International Search Report for corresponding application PCT/JP2016/050783; dated Mar. 15, 2016; with english translation.
Extended European Search Report corresponding to Application No. 16737355.4-1017/3246276 PCT/JP2016050783; dated Jan. 15, 2018.

* cited by examiner

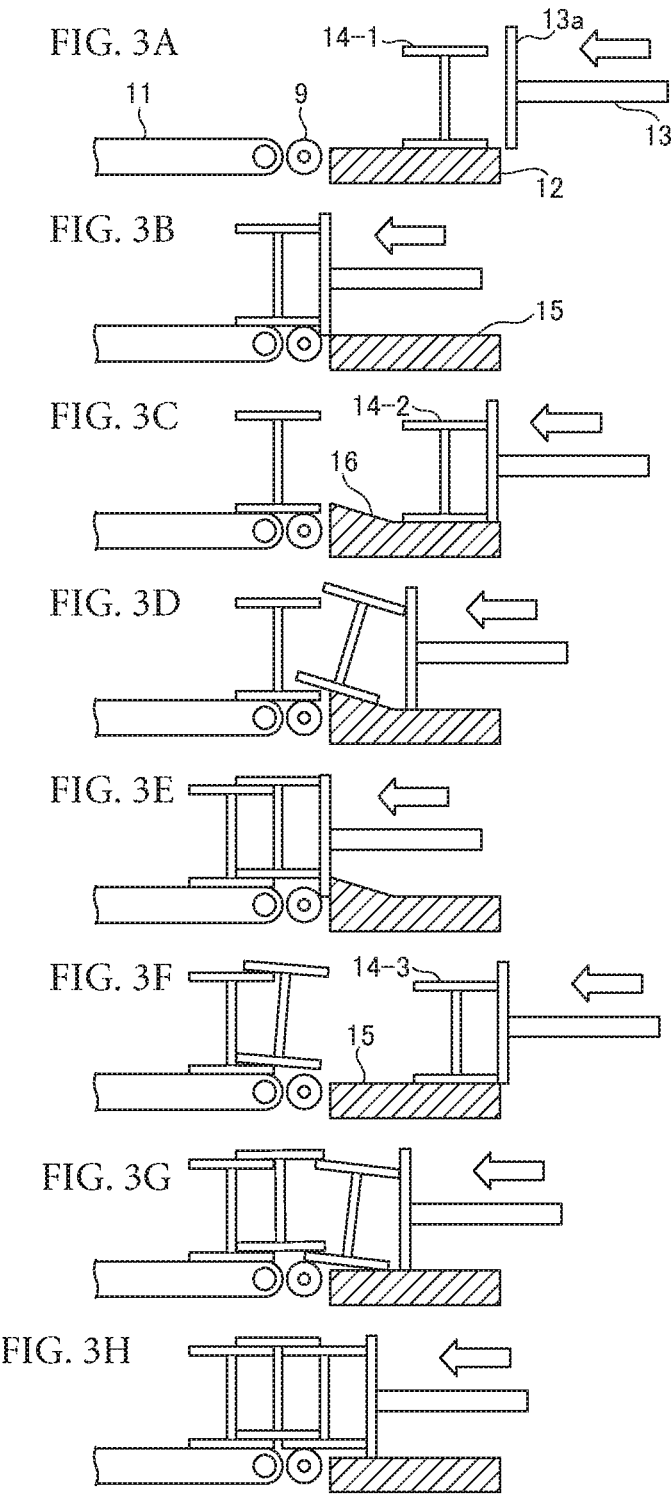

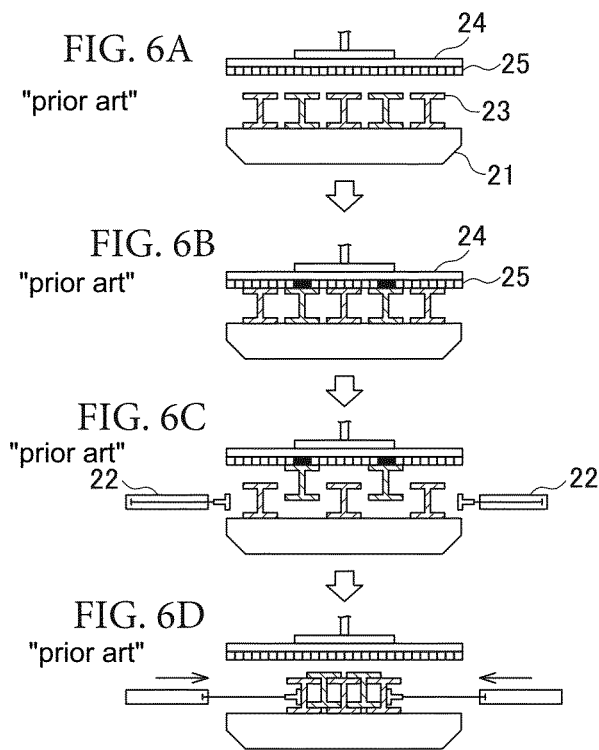
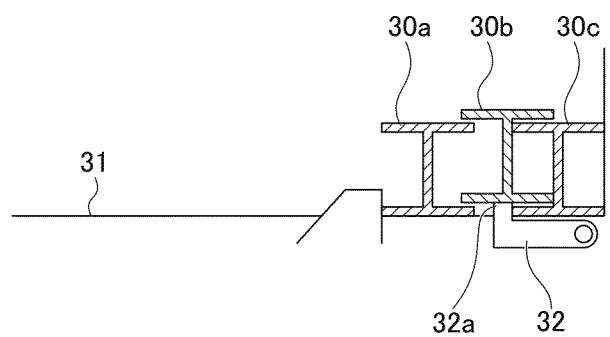

SHAPED STEEL STACKING DEVICE

CROSS REFERENCE TO PRIOR APPLICATIONS

This is the U.S. national stage of application No. PCT/JP2016/050783, filed Jan. 13, 2016. Priority under 35 U.S.C. § 119(a) and 35 U.S.C. § 365(b) is claimed from Japanese Application No. 2015-004269, filed Jan. 13, 2015, the disclosures of which are also incorporated herein by reference.

TECHNICAL FIELD

The present invention relates to a stacking device for stacking a plurality of shaped steel products.

BACKGROUND ART

When storing multiple H-shaped steel products, a device (stacking device) for stacking multiple H-shaped steel products is used in a way such that the flange portions of the multiple H-shaped steel products are alternately stacked. According to conventional stacking devices, multiple H-shaped steel products are arranged on the same surface, and then those arranged at an even number in the sequence are moved in the vertical direction. Other H-shaped steel products are then pushed in transversely to allow the flange portions of these H-shaped steel products to stack alternately. Then stacking of the multiple H-shaped steel products is completed. When moving the H-shaped steel products at an even number in the sequence, a means for pushing them up from underneath or lifting them up from above may be used. Further, a means for moving H-shaped steel products one at a time, or a means for moving them simultaneously may be used when they are moved.

For example, as shown in FIGS. 6A TO 6D, Patent Document 1 discloses a stacking device including a lift magnet 24 having a plurality of electromagnets 25 for attracting every other piece of shaped steel products 23 arranged on a stacking table 21 in a predetermined interval; and a pusher 22 for pushing the shaped steel products 23 from both sides to allow the shaped steel products 23 to sequentially overlap each other. As shown in FIG. 6A, the H-shaped steel products 23 are brought in on the stacking table 21. Then, as shown in FIG. 6B, the lift magnet 24 descends, and those among the electromagnets 25 corresponding to the every other pieces of the H-shaped steel products 23 are magnetized. Then, every other piece of the H-shaped steel products ascends as the lift magnet 24 ascends as shown in FIG. 6C. Subsequently, when the electromagnets are unmagnetized while pushing the H-shaped steel products 23 inwardly with the pushers 22 arranged at both sides, the multiple H-shaped steel products 23 are stacked on the stacking table 21 as shown in FIG. 6D.

Further, as shown in FIG. 7, Patent Document 2 discloses an integrated device in which an upward-pushing link arm piece 32 is arranged at a predetermined upward-pushing position, the upward-pushing link arm piece 32 being vertically movable relative to a transferring skid surface 31. H-shaped steel products 30b and 30c are loaded in an overlapping fashion on the transferring skid surface 31. The H-shaped steel 30b is upwardly pushed with an upward-pushing protrusion 32a of the upward-pushing link arm piece 32, and then an adjacent H-shaped steel product 30a is put together from a side to allow multiple H-shaped steel products to be stacked.

Patent Document 1: Japanese Unexamined Patent Application, Publication No. S60-236928
Patent Document 2: Japanese Examined Patent Application Publication No. H06-079937

DISCLOSURE OF THE INVENTION

Problems to be Solved by the Invention

As described above, in the conventional stacking devices, components such as a lifting table, a support pin, and an upward-pushing device are used in combination to vertically move H-shaped steel products. However, the conventional stacking devices are disadvantageous in that they have complex overall structures, and also require significantly larger equipment, resulting in increased cost and large required space. They also have operational disadvantages in that the position of an upward-pushing device or the like needs to be adjusted according to the flange width of an H-shaped steel product to be stacked, resulting in complicated stacking devices in terms of mechanism and operations.

Therefore, a practical device for stacking shaped steel products such as H-shaped steel products has been demanded in which the positions of components of the device need not to be adjusted according to the dimension of the H-shaped steel products, and the entire configuration of the stacking devices can be implemented in small scale equipment for stacking.

Means for Solving the Problems

The present inventor found that a stacking device for stacking shaped steel products, which can be implemented in small scale equipment having a transfer mean with a simple structure can be provided. Then, the present invention has been completed. Specifically, the present invention can provide the following.

(1) The present invention can provide a stacking device for stacking a plurality of shaped steel products, including: a stacking platform to be loaded with the shaped steel products in a stacked manner; a transferring platform having multiple loading surfaces to be loaded with at least one of the shaped steel products to be transferred to the stacking platform; and a pushing mean for pushing the at least one of the shaped steel products loaded on the transferring platform toward the stacking platform, wherein the transferring platform includes a first loading surface having a flat portion and a second loading surface having a flat portion and an inclined portion, and the inclined portion is formed on a side facing the stacking platform, and the first and second loading surfaces are selectable according to the order in which the shaped steel products are pushed.

(2) The present invention can provide the stacking device for stacking shaped steel products according to the above (1), wherein the second loading surface is arranged so that the height level of the inclined portion in the side facing the stacking platform is arranged at or above the thickness of a flange of the at least one of the shaped steel products loaded on the stacking platform.

(3) The present invention can provide the stacking device for stacking shaped steel products according to the above (1) or (2), wherein in the transferring platform, the first loading surface is selected when at least one of the odd numbered shaped steel products is transferred, and the second loading surface is selected when at least one of the even numbered shaped steel products is transferred.

(4) The present invention can provide the stacking device for stacking shaped steel products according to any one of the above (1) to (3), wherein the transferring platform is a rotating body having circumferentially-arranged multiple loading surfaces.

(5) The present invention can provide the stacking device for stacking shaped steel products according to any one of the above (1) to (4), wherein an intervening member is provided between the stacking platform and the transferring platform.

Effects of the Invention

The present invention can provide a stacking device having a transferring platform including multiple loading surfaces, the multiple loading surfaces including a first loading surface having a flat portion and a second loading surface having a flat portion and an inclined portion. According to the present invention, the transferring means as described above is provided to eliminate the necessity of having an additional means for lifting and lowering shaped steel products as in the conventional devices. Therefore, the configuration of the device is simple, and no additional space is required. Moreover, the loading surfaces can be simply selected according to the order in which shaped steel products are pushed, making the operational procedures easy. Consequently, it is effective in terms of decreased cost and improved working efficiency.

BRIEF DESCRIPTION OF THE DRAWINGS

FIG. 1A represents a top view, and FIG. 1B represents a side view.

FIGS. 3A-3H illustrate a process for stacking H-shaped steel products using the stacking device according to the present invention, and shows how the process proceeds in the order from FIG. 3A to FIG. 3H.

FIG. 4A represents how the first H-shaped steel product is transferred, and FIG. 4B represents how the third H-shaped steel product is transferred.

FIG. 5A represents an example of the intervening member having a semicircular cross section, and FIG. 5B represents an example of the intervening member having an inclined cross section.

FIGS. 6A-6D illustrate an example of the conventional stacking device, and shows how a stacking process proceeds in the order from FIG. 6A to FIG. 6D.

FIG. 7 shows an example of the conventional stacking device.

PREFERRED MODE FOR CARRYING OUT THE INVENTION

Figure 1A:
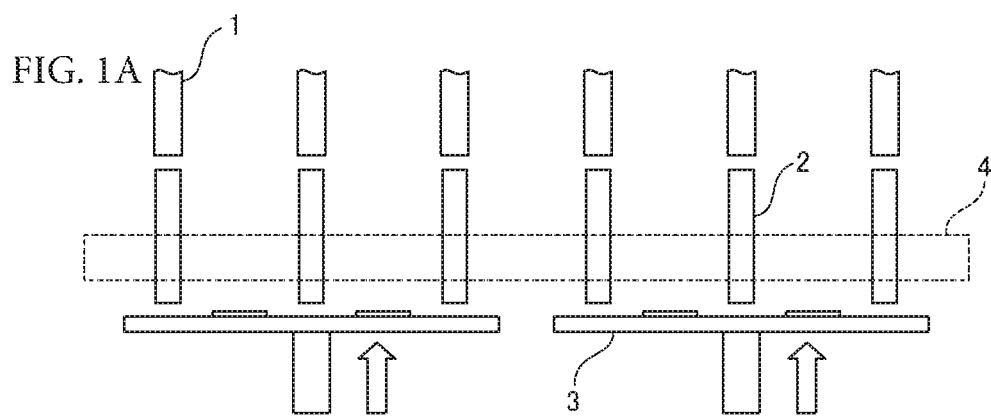
FIGS. 1A-1B are a schematic view illustrating the configuration of a stacking device according to the present invention.

Below, embodiments of the present invention will be described. The present invention shall not be limited to the following descriptions.

The present invention can provide a stacking device for stacking a plurality of shaped steel products. As shown in FIG. 1, the stacking device according to the present invention includes a stacking platform 1 to be loaded with the shaped steel product 4 which is to be stacked, a transferring platform 2 having multiple loading surfaces 5 and 6 to be loaded with the shaped steel product 4 which is to be transferred to the stacking platform 1, and a pushing means 3 for pushing the shaped steel product 4 loaded on the transferring platform 2 toward the stacking platform 1.

(Stacking Platform)

The stacking platform 1 according to the present invention has a stacking surface on which a plurality of the shaped steel products 4 are to be loaded in a stacked manner. On the stacking surface of the stacking platform 1, a plurality of the shaped steel products 4 are stacked with the flanges thereof alternately stacked each other. A certain number of these stacked shaped steel products 4 are bundled, and then transferred to a storage site. As the stacking platform 1, a platform with a fixed stacking surface, a platform with a continuously moving stacking surface, and the like can be used. A surface which makes contact with a shaped steel product preferably includes a material such as, for example, MC Nylon® and the like, which can prevent scratches on the shaped steel product. When a large number of the shaped steel products 4 are stacked continuously, a loading means with a moving stacking surface such as, for example, a rotary belt may be used, in which the shaped steel products are to be stacked on a belt thereof. A shaped steel product loaded on a rotary belt is pushed away from the transferring platform by the next supplied shaped steel product. Each time the above process is performed, the belt moves horizontally along with shaped steel products, allowing a large number of shaped steel products to be stacked continuously.

(Transferring Platform)

The transferring platform 2 according to the present invention serves as a means for allowing the shaped steel product 4 which will be stacked on the stacking platform 1 to be loaded thereon and transferring the shaped steel product 4 to the stacking platform 1. On the transferring platform 2, the shaped steel product 4 is loaded on a surface located on the side opposite to the stacking platform 1. It then serves as a means for moving the shaped steel product 4 toward the stacking platform 1 to transfer the shaped steel product 4 onto the stacking platform 1.

Figure 2:
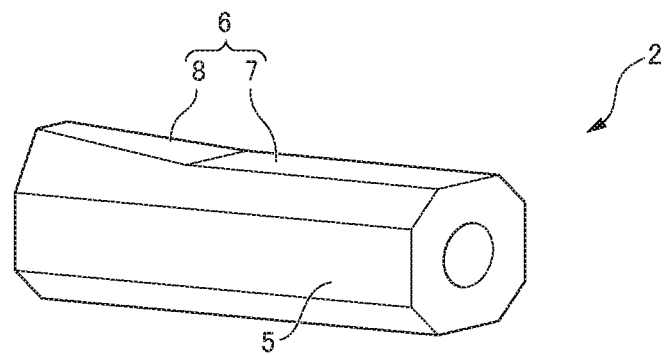
FIG. 2 is a schematic perspective view illustrating the configuration of a transferring platform according to the present invention.

The transferring platform 2 according to the present invention has multiple loading surfaces as loading surfaces on which the shaped steel products 4 are to be loaded. FIG. 2 shows a schematic configuration of the transferring platform. The transferring platform 2 is a means including a first loading surface 5 having a flat portion only and a second loading surface 6 having a flat portion 7 and an inclined portion 8. The second loading surface 6 is configured such that the inclined portion 8 is formed in the side facing the stacking platform 1, and the flat portion 7 is formed in a position opposite to the stacking platform 1.

Upon sequential transfer of a plurality of shaped steel products with the transferring platform 2 according to the present invention, the first loading surface 5 is selected when an odd numbered shaped steel product is transferred, and the second loading surface 6 is selected when an even numbered shaped steel product is transferred. That is, the first shaped steel product is moved to the stacking platform 1 using the first loading surface 5, and then the next second shaped steel product is moved to the stacking platform 1 using the second loading surface 6. This allows the second shaped steel product to be loaded on the stacking platform 1 such that a flange of the second shaped steel product enters over a flange of the first shaped steel product for stacking.

Subsequently, when the third shaped steel product is transferred, it is loaded on the stacking platform 1 again using the first loading surface 5 such that a flange of the third shaped steel product enters into under a flange of the second shaped steel product for stacking. Subsequently when the fourth shaped steel product is transferred, the second loading surface 6 is used. Alternate stacking of the flanges of a plurality of shaped steel products can be achieved by repeating the transfer each time selectively using the first loading surface 5 or the second loading surface 6. As described above, the first loading surface 5 is selected when odd numbered shaped steel products such as the first and the third are transferred while the second loading surface 6 is selected when even numbered shaped steel products such as the second and the fourth are transferred.

In the transferring platform 2 according to the present invention, multiple loading surfaces 5 and 6 are selectively used, and thus a rotating body circumstantially including multiple loading surfaces and having chamfered corners is preferred. There is no particular limitation for the surfaces other than the two surfaces on which the first loading surface 5 and the second loading surface 6 are provided, and any can be used. For example, when a polygonal rotating body having a rectangular or hexagonal cross-section with chamfered corners has a plurality of the first loading surfaces 5 or a plurality of the second loading surfaces 6 provided on the multiple surfaces thereof, the number of loading surfaces to be selected are increased, avoiding a worn loading surface.

Another surface may be provided between the first loading surface 5 and the second loading surface 6. Further, a loading surface having an inclined portion differently angled depending on the size and shape of a shaped steel product can be prepared. As a material for the main body or the loading surfaces of the transferring platform, preferably used is a material such as, for example, MC Nylon®, which does not easily cause scratches when a shaped steel product is pushed to slide with a pushing mechanism.

As described above, a plurality of shaped steel products can be stacked efficiently by virtue of the transferring platform 2 having the multiple loading surfaces 5 and 6 provided selectably according to the order in which the shaped steel products are pushed. According to the present invention, stacking can be performed using a simple device, i.e., a transferring platform having multiple loading surfaces. Therefore, cost, working efficiency, and the like are superior to those of the conventional device.

Further, the inclined portion 8 provided in the second loading surface 6 is designed to achieve a state in which a flange of a shaped steel product being moved is stacked and placed over a flange of a preceding shaped steel product which has been loaded on the stacking platform 1. In this context, the second loading surface 6 is preferably arranged so that the height level of the inclined portion 8 in the side facing the stacking platform is arranged at or above the thickness level of the flange of the preceding shaped steel product. According to this configuration, even a shaped steel product having a large flange thickness can be smoothly loaded without colliding with the flange of a preceding shaped steel product when advanced to the platform 1.

Figure 4A:
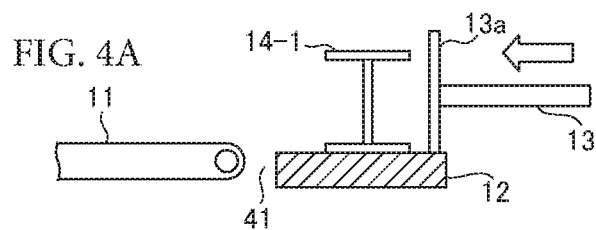
FIGS. 4A-4B show another embodiment of the stacking device according to the present invention.
Figure 4B:
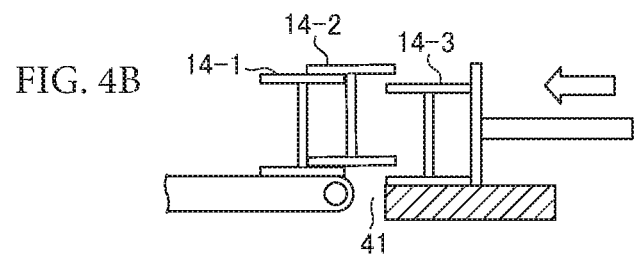

Further, a configuration is preferred in which a gap is provided between the stacking platform 1 and the transferring platform 2. The presence of the gap can provide a space for allowing the next shaped steel product to be transferred to slide into under the flange of the preceding shaped steel product. This is preferred in view of smooth stacking. For example, as shown in FIG. 4A, there is a gap 41 between a rotary belt 11 serving as a stacking platform and transferring platforms 12 at an end of the rotary belt 11 facing a transferring platform 12. After the first H-shaped steel product 14-1 is loaded on the rotary belt 11, a flange of the second H-shaped steel product 14-2 is loaded over a flange of the H-shaped steel product 14-1, and both of the H-shaped steel products are then stacked. As shown in FIG. 4B, a space of the gap 41 is formed under the flange of the H-shaped steel product 14-2. This is preferred because a flange of the third H-shaped steel product 14-3 to be transferred next can easily enter into under the flange of the preceding H-shaped steel product 14-2, allowing for smooth stacking. Further, when a roller as an intervening member 9 as described below is provided at the gap between the stacking platform 1 and the transferring platform 2, shaped steel products can be moved more smoothly.

(Pushing Means)

The stacking device according to the present invention includes a pushing means 3 for pushing the shaped steel product 4 loaded on the transferring platform 2 toward the stacking platform 1. There is no particular limitation for the form thereof as long as it can abut with a shaped steel product for pushing. For example, those including a driving mechanism for pushing a plate-like surface can be used such as a pusher 13 shown in FIGS. 3A-3H. Publicly known means having a cylinder, a link, a slider crank, and the like, which are powered by air, oil pressure, and a motor, and the like can be used as the driving mechanism. In order to apply uniform pushing force throughout a shaped steel product having a pair of flanges, the pushing means preferably includes a pushing surface 13a having a height and area large enough for abutting with a flange of the shaped steel product at a side abutting with the shaped steel product. Further, the shape of the pushing surface is preferably plate-like so as to correspond to the various height levels of various shaped steel products.

(Intervening Member)

Figure 5A:
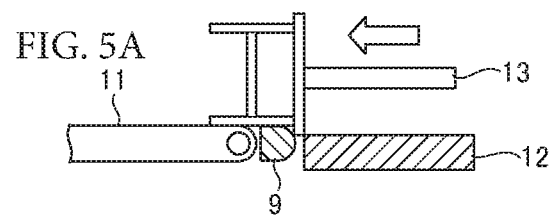
FIGS. 5A-5B show an example of an intervening member according to the present invention.
Figure 5B:
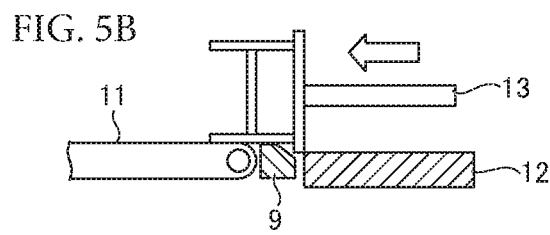

The transferring platform 2 is arranged so as to face the stacking platform 1, and the intervening member 9 may be provided between the stacking platform 1 and the transferring platform 2 so that the shaped steel product 4 can enter smoothly when entering onto the stacking platform 1 from the transferring platform 2. The intervening member 9 is preferably a rotating roller such as the roller 9 shown in FIGS. 3A-3H because a shaped steel product can slide on the roller to be transferred, enabling easy conveyance of the shaped steel product. Further, the intervening member may be non-rotatable. A member with a semicircular cross section or a polygonal cross section having an inclined portion in some region thereof can be used, the member having a flat surface over which a shaped steel product passes. For example, the intervening member 9 having a semicircular cross section as shown in FIG. 5A may be used. The intervening member 9 having an inclined cross section in some region thereof as shown in FIG. 5B may be used. A material for the main body and surfaces of the intervening member is preferably MC Nylon® and the like, which is excellent in scratch resistance and abrasion resistance.

Shaped steel products which can be stacked using the stacking device according to the present invention, are preferably H-shaped steel products each having symmetrical flanges on both sides of the web. Shaped steel products in other forms can also be used such as I-shaped steel products each having a cross-sectional shape similar to that of an H-shaped steel product.

EXAMPLES

Below, Examples of the present invention will be described, but the present invention shall not be limited to the following Examples. Appropriate modifications may be made to the present invention without departing the spirit and scope of the present invention.

Figure 1B:
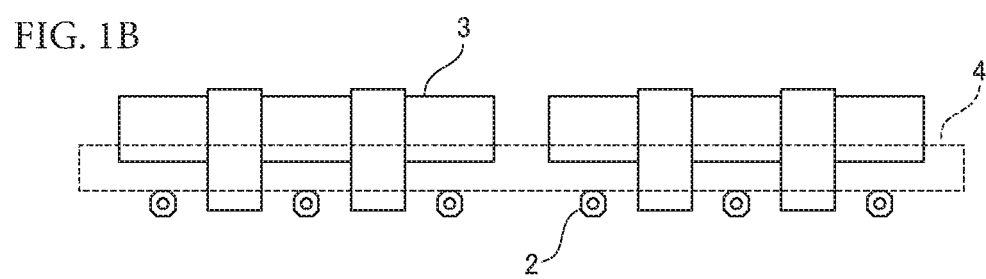

FIGS. 1A-1B show a specific example of the stacking device according to the present invention. Shown is equipment including two stacking devices, the stacking devices each including three rotary belts (stacking platforms 1), three stacking rollers (transferring platforms 2), and one pusher (pushing means 3). A plate-like member which can pass through between the transferring platforms is provided in the pusher. The H-shaped steel product 4 has been brought in from a storage site thereof (not shown) to the transferring platforms 2, and spans and lies on the transferring platforms 2 of the two stacking devices, and is ready for the procedure.

FIG. 2 is a schematic view showing a specific example of the transferring platform 2 according to the present invention. The transferring platform 2 is a polygonal cylinder having a cross-sectional shape of a rectangle with chamfered corners, and is rotatable. Further, it includes the first loading surface 5 having a flat portion and the second loading surface 6 having the flat portion 7 and the inclined portion 8. Rotation of the polygonal cylinder by 90 degrees allows for the selection of the first loading surface 5 or the second loading surface 6, and also allows for repeated use.

FIGS. 3A-3H show a process for stacking by using the stacking device according to the present invention. As shown in FIGS. 3A-3H, the stacking device according to the present invention includes the rotary belt 11 which corresponds to the stacking platform, the stacking roller 12 which corresponds to the transferring platform, the pusher 13 which corresponds to the pushing means, and the roller 9 which corresponds to the intervening member. The stacking roller 12 is arranged so that the first loading surface 15 having a flat portion is turned to be the upper surface. The first H-shaped steel product 14-1 to be stacked is loaded on the first loading surface 15, and ready for the following step.

First, the pusher 13 moves toward the H-shaped steel product on the stacking roller 12 as shown in FIG. 3A. After making contact with the H-shaped steel product 14-1, the pusher 13 moves so as to push the H-shaped steel product 14-1 toward the rotary belt 11. The surface 13a on which the pusher 13 makes contact with the H-shaped steel product has a height and area large enough for pushing both of the flanges of the H-shaped steel product.

As shown in FIG. 3B, the first H-shaped steel product 14-1 passes over the roller 9, and is transferred onto the rotary belt 11 where it is loaded on the roller 9 and the rotary belt 11. At this time, the first loading surface 15 of the transferring platform is arranged so that the height level of an end of the loading surface 15 facing the rotary belt 11 is positioned below the loading surface of the rotary belt 11. In order to transfer the H-shaped steel product to the rotary belt, the above end of the loading surface 15 may simply be positioned below the loading surface of the rotary belt 11 by the thickness of the flange of the H-shaped steel product. The shaped steel product which moves to the rotary belt from the transferring platform can slidably pass through on the roller-like intervening member. Therefore, the height of the transferring platform which is set outside the range of the flange thickness will not cause a problem.

Next, the stacking roller 12 which corresponds to the transferring platform is allowed to rotate so that the second loading surface 16 having the flat portion 7 and the inclined portion 8 is turned to the upper side. At this time, the second loading surface 16 of the transferring platform is arranged so that the height level of an end of the inclined portion of the loading surface 16 facing the rotary belt 11 is positioned above the loading surface of the rotary belt 11. When the above end of the second loading surface 16 is arranged at a position equal to or higher than the loading surface of the rotary belt by the thickness of the flange of the H-shaped steel product, collision with the flange of the H-shaped steel product 14-1 can be avoided. Therefore, this configuration is preferred.

As shown in FIG. 3C, the second H-shaped steel product 14-2 is placed on the flat portion of the second loading surface 16. Then, the second H-shaped steel product 14-2 is pushed with the pusher 13. The H-shaped steel product 14-2 moves along the surface of the inclined portion of the second loading surface 16 as shown in FIG. 3D. At this time, the pushing surface 13a of the pusher makes contact with the upper flange of the second H-shaped steel product 14-2 only, and then moves so as to further push the H-shaped steel product. Then, the flange of the second H-shaped steel product 14-2 which has crossed over the inclined portion makes contact with the web of the preceding first H-shaped steel product 14-1.

The second H-shaped steel product 14-2 continues to push the first H-shaped steel product 14-1 with which the second H-shaped steel product 14-2 has made contact. As a result, the preceding first H-shaped steel product 14-1 moves along with a belt of the rotary belt 11, and both of the H-shaped steel products are arranged such that the flange of the second H-shaped steel product 14-2 is loaded on the flange of the H-shaped steel product 14-1 as shown in FIG. 3E.

Next, the stacking roller 12 is rotated and arranged so that the first loading surface 15 having a flat portion is turned to be the upper side. At this time, the height level of the first loading surface 15 can be arranged in a similar way as shown in FIG. 3A. When the height level of the first loading surface 15 is arranged at a still lower position, depending on the extent of the downward inclination of the flanges of the preceding H-shaped steel product 14-2 as shown in FIG. 3F, a flange of the third H-shaped steel product 14-3 can easily enter into under the flange of preceding H-shaped steel product 14-2. Subsequently, the third shaped steel product 14-3 is placed on the transferring platform. Then, the third H-shaped steel product 14-3 is pushed with the pusher 13.

As shown in FIG. 3G, a flange of the third H-shaped steel product 14-3 enters into under the flange of the second H-shaped steel product 14-2.

When the third H-shaped steel product 14-3 is continuously pushed, the second H-shaped steel product 14-2 and the first H-shaped steel product 14-1 moves along with a belt of the rotary belt 11, leading to a state where the third H-shaped steel product 14-3 is loaded on the roller 9 and the rotary belt 11 as shown in FIG. 3H.

Every time the fourth, fifth H-shaped steel products and so on are subsequently transferred, the first loading surface 15 of the stacking roller 12 is selected when an odd numbered H-shaped steel product is transferred, and the second loading surface 16 of the stacking roller 12 is selected when an even numbered H-shaped steel product is transferred. After repeating the above procedures, stacked multiple H-shaped steel products on the rotary belt 11 can be obtained.

EXPLANATION OF REFERENCE NUMERALS

1 Stacking platform
2 Transferring platform
3 Pushing means
4 shaped steel product
5 First loading surface
6 Second loading surface 7 Flat portion
8 Inclined portion
9 Roller (Intervening member)
11 Rotary belt
12 Stacking roller
13 Pusher
13a Pushing surface
14 H-shaped steel product
14-1 First H-shaped steel product
14-2 Second H-shaped steel product
14-3 Third H-shaped steel product
15 First loading surface
16 Second loading surface
21 Stacking table
22 Pusher
23 Shaped steel product
24 Lift magnet
25 Electromagnet
30a, 30b, 30c H-shaped steel product
31 transferring skid surface
32 Upward-pushing link arm piece
32a Upward-pushing protrusion
41 Gap

The invention claimed is:

1. A stacking device for stacking a plurality of shaped steel products having a flange, comprising:
a stacking platform to be loaded with the shaped steel products in a stacked manner;
a transferring platform having multiple loading surfaces to be loaded with at least one of the shaped steel products to be transferred to the stacking platform; and
a pusher for pushing the at least one of the shaped steel products loaded on the transferring platform toward the stacking platform,
wherein
the transferring platform is a rotating body rotatable around a pushing direction along which the pusher pushes, and comprises on its circumference a first loading surface having a flat portion and a second loading surface having a flat portion and an inclined portion, the flat portion and the inclined portion being formed along the pushing direction,
the inclined portion being formed at an end of the transferring platform proximate to the stacking platform, and
the first and second loading surfaces being arranged so as to be selectable according to an order in which the shaped steel products are pushed, and
the second loading surface is arranged so that the height level of the inclined portion at the end of the transferring platform proximate to the stacking platform is arranged at or above the thickness of the flange of the at least one of the shaped steel products loaded on the stacking platform as compared with the height of the stacking platform, and
the first loading surface is arranged so that the height level of the flat portion at the end of the transferring platform proximate to the stacking platform is arranged at or below the thickness of the flange of the at least one of the shaped steel products loaded on the stacking platform as compared with the height of the stacking platform.

2. The stacking device for stacking shaped steel products according to claim 1, wherein the order in which the shaped steel products are pushed includes a plurality of odd-numbered shaped steel products and a plurality of even-numbered shaped steel products; the first loading surface is selected when one of the plurality of odd-numbered shaped steel products is transferred, and the second loading surface is selected when one of the even-numbered shaped steel products is transferred.

3. The stacking device for stacking shaped steel products according to claim 1, wherein the transferring platform is a rotating body comprising a plurality of the first loading surfaces and second loading surfaces.

4. The stacking device for stacking shaped steel products according to claim 1, wherein an intervening member is provided between the stacking platform and the transferring platform.

* * * * *